Jan. 30, 1968  W. J. YOUNG  3,366,420
MULTI-TOOL SCABBLING UNIT
Filed Oct. 14, 1965  3 Sheets-Sheet 1
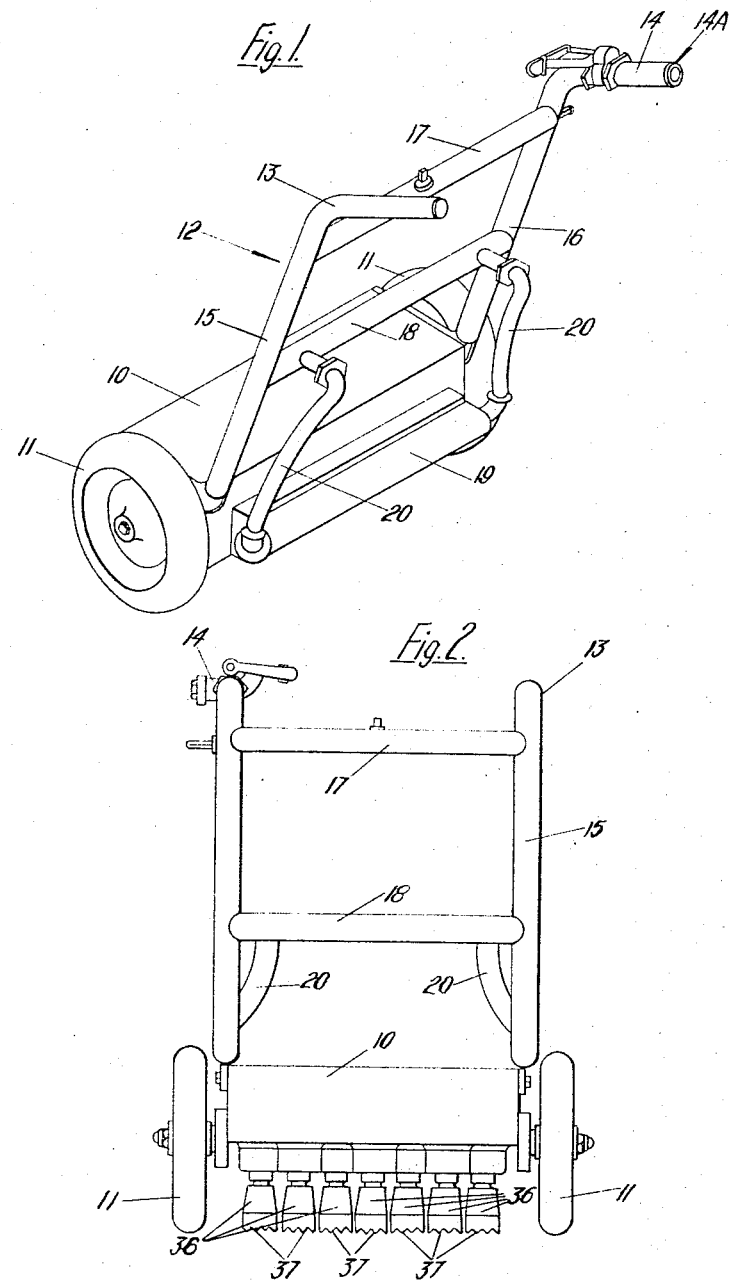
Inventor
WILLIAM J. YOUNG
By Young & Thompson
Attorneys

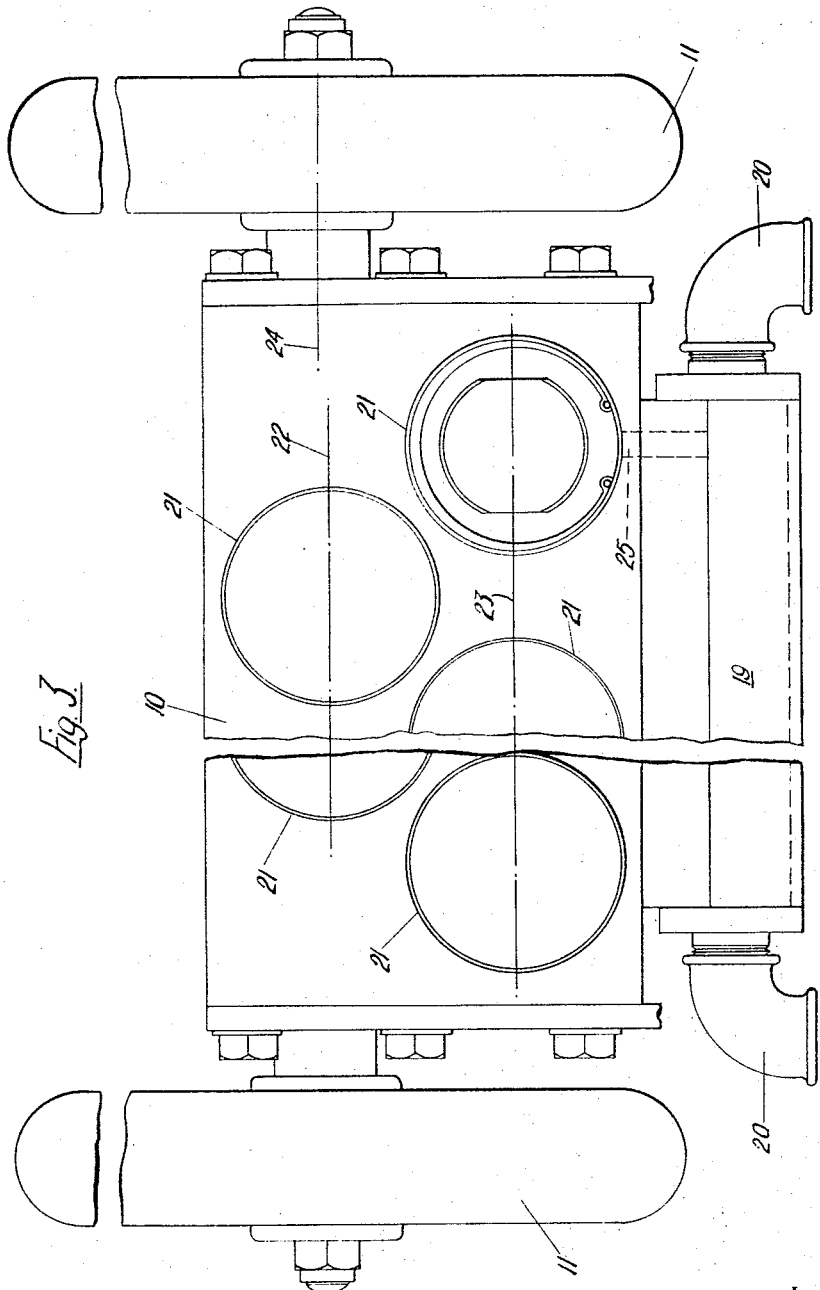

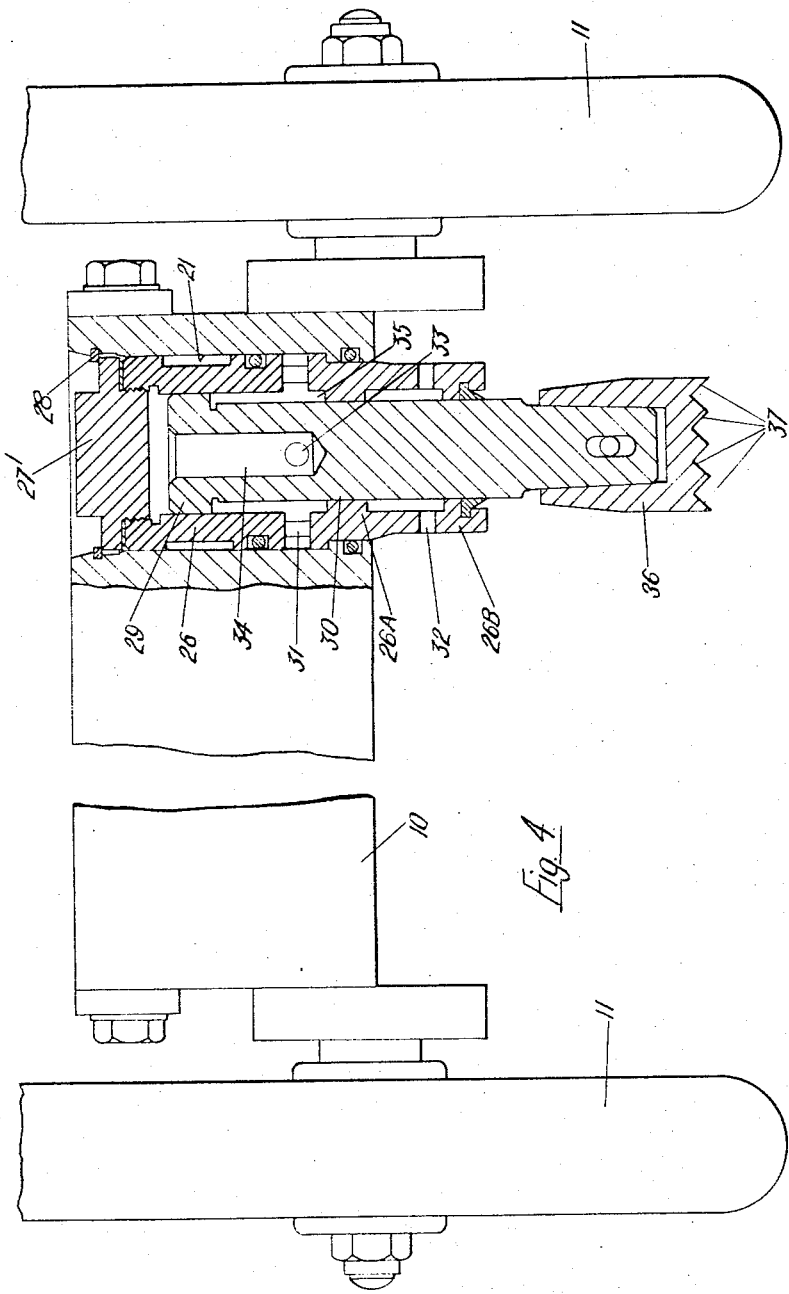

United States Patent Office 3,366,420
Patented Jan. 30, 1968

3,366,420
MULTI-TOOL SCABBLING UNIT
William J. Young, East Kilbride, Scotland, assignor to John MacDonald & Co. (Pneumatic Tools) Ltd., East Kilbride, Scotland, a British company
Filed Oct. 14, 1965, Ser. No. 496,095
Claims priority, application Great Britain, Feb. 25, 1965, 8,078/65
2 Claims. (Cl. 299—37)

ABSTRACT OF THE DISCLOSURE

A multi-tool scabbling unit comprises a cylinder block having a plurality of cylinders in which tool-carrying fluid operated pistons reciprocate, the block being mounted on a pair of ground wheels, one at each end of the block, and having rearwardly extending manipulating handles. There is little or no turning moment about the axis of the wheels resulting from reaction to the impact of the tools on the ground, and the block therefore lifts so that the wheels clear the ground, and the unit can be swung from side to side of its path of advance.

---

This invention relates to apparatus especially, but not exclusively for scabbling concrete.

According to the present invention there is provided apparatus for scabbling concrete and comprising a cylinder block, a plurality of cylinders in said block, and each having a fluid inlet and a fluid outlet and a reciprocable, fluid pressure operated piston in each cylinder, each piston extending from the block and adapted, at the end outside the block, to have a scabbling tool connected thereto.

Preferably there is provided an inlet manifold on the cylinder block which supplies pressure fluid simultaneously to each fluid inlet.

An embodiment of the invention will now be described, by way of example, with reference to the accompanying drawings, wherein:

FIG. 1 is a perspective view of apparatus for scabbling concrete and according to the present invention, FIG. 2 is an elevation of the apparatus shown in FIG. 1, FIG. 3 is a plan of part of apparatus shown in FIG. 1 and FIG. 4 is an elevation, partly in section, of the part of the apparatus shown in FIG. 3.

Referring to the drawings, in particular FIG. 1, apparatus for scabbling concrete comprises a cylinder block 10 supported on ground wheels 11 and having a frame 12 for guiding and pushing the apparatus during operation. The frame 12 has handles 13, 14.

The frame 12 is made up of tubular members and comprises two side tubes 15, 16 attached to the block 10 and extending upwardly and rearwardly therefrom; the handles 13, 14 are formed at the upper ends of the side tubes 15, 16. Cross tubes 17, 18 interconnected the side tubes, and handle 14, side tube 16 and lower cross tube 18 form a conduit for pressure fluid which is supplied to an inlet manifold 19 through connecting pipes 20 tapped from the lower cross tube 18; the handle 14 is, in operation, connected at 14A to a source of fluid under pressure, in this example air, and is formed as a rotatable throttle control, to control the supply of air to the manifold 19.

In the plan, FIG. 3, it will be observed that the cylinder block has seven cylinder bores 21; three arranged on one axis 22 and four arranged on a spaced parallel axis 23, the cylinders on axis 22 being staggered relative to the cylinders on axis 23. The axes 22, 23, are parallel to the wheel axis 24 and are rearwards thereof. Although only one is shown in FIG. 3, the cylinder block has seven passages 25, each communicating with the inlet manifold 19 and with one cylinder bore 21.

As best seen in FIG. 4, each cylinder bore 21 is provided with a cylinder liner 26 held in place in the bore 21 by a cap 27 to which it is screwed and which is retained by a spring ring 28. The liner 26 has a reciprocable fluid pressure operated piston 29 slidably contained therein and has lands 26A, 26B which sealingly engage the piston rod 30 and guide the piston 29. The liner 26 has a fluid inlet port 31 and a fluid outlet port 32, these being on the upper and lower sides of the land 26A. The piston 29 is provided with porting including a radial port 33 in the piston rod and in communication with an axial bore 34 in the piston rod 30 and open to the piston crown side. When the piston 29 is at the top of the liner 26, the radial port 33 and hence the piston crown, communicate with an annular space 35 defined by the piston 29, piston rod 30, liner 26, and the land 26A; this annular space 35 is supplied with pressure fluid from the inlet port 31. When the piston 29 is at the bottom of the liner 26, the radial port 33 communicates with the fluid outlet 32.

The piston 29 projects from the cylinder block 10, and the liner 26, and at the end outside the block 10 has detachably connected thereto a scabbling tool or hammer 36. The seven hammers 36 are clearly seen in FIG. 2. These hammers 36 extend to nearly ground level and the lower surface of each is provided with projections 37 for breaking up the concrete.

The apparatus is most advantageously used where it is desired to break off a hard scum crust which forms on the surface concrete when it sets. The apparatus is wheeled over the concrete and air is admitted to the inlet manifold 19 by control of the throttle handle 14 whereafter the pressure air is supplied to the annular spaces 35 under the pistons 29, which are raised. The raising continues until the radial ports 33 in the piston rods 30 communicated with the annular spaces 35 and the pressure air passes to the piston crowns.

Because the piston surface areas on the crown sides are substantially larger than the piston surface areas on the rod sides (as seen in FIG. 4), the pistons 29 are forced rapidly downwards so that the scabbling tools 36 strike and break the scum surface on the concrete. In the downward motion, the radial ports 33 pass the lands 26A and so communicate with the outlet ports 32 and the air on the piston crown side is exhaused to atmosphere; the cycle is then repeated. The frequency of hammering is high and this has the effect that the wheels 11 actually leave the ground due to reaction, and the apparatus may be swung over the concrete with a scything motion.

Modification of the invention may be made, for example the outlet ports may exhaust into an open-topped casing to prevent dust from the ground being blown onto the apparatus and into the inlet ports. Also, there may be more or less than seven cylinders and the arrangement of the cylinders may be different. Although the above embodiment is a scabbling device for concrete, it will be understood that the invention may have other applications and in fact may be used to roughen or scabble any suitable surface.

I claim:

1. In apparatus for scabbling concrete and mounted on a pair of wheels and having rearwardly extending manipulating handles, and a scabbling head which comprises a plurality of cylinders arranged in two rows which are one behind the other and parallel to the rotary axis of the ground wheels and a reciprocable fluid-operated piston in each cylinder, each piston projecting downwardly from its cylinder and, at its end outside the cylinder carrying a scabbling tool; the improvements that said cylinders are in a cylinder block, the said ground wheels are mounted one at each end of the block, and the vertical medial plane of the front row of cylinders is spaced a short distance rearwardly from the rotary axis of the ground wheels.

2. In apparatus for scabbling concrete and mounted on a pair of wheels and having rearwardly extending manipulating handles, and a scabbling head which comprises a plurality of cylinders arranged in two rows which are one behind the other and parallel to the rotary axis of the ground wheels and a reciprocable fluid-operated piston in each cylinder, each piston projecting downwardly from its cylinder and, at its end outside the cylinder carrying a scabbling tool; the improvements that said cylinders are in a single cylinder block, the said ground wheels are mounted one at each end of the block, and the vertical medial plane of the front row of cylinders is spaced a short distance rearwardly from the rotary axis of the ground wheels, whereby, in operation, there is little or no turning movement of the block about the axis of the ground wheels resulting from reaction to the impact of the tools on the ground, and the wheels may rise off the ground so that the apparatus can be swung from side to side of its path of advance.

References Cited

UNITED STATES PATENTS

| | | | |
|---|---|---|---|
| 1,484,944 | 2/1924 | Hansen | 94—49 |
| 2,553,435 | 5/1951 | Briese | 299—37 X |
| 2,562,899 | 8/1951 | Finn | 94—49 X |

FOREIGN PATENTS

| | | |
|---|---|---|
| 531,835 | 8/1955 | Italy. |
| 154,803 | 12/1920 | Great Britain. |

ERNEST R. PURSER, *Primary Examiner.*